United States Patent
Curran et al.

(10) Patent No.: US 11,213,114 B1
(45) Date of Patent: Jan. 4, 2022

(54) ANIMAL CALL CARRIER

(71) Applicants: Jamie Curran, Durango, CO (US);
Warren P Mitchell, Jr., Milliken, CO (US)

(72) Inventors: Jamie Curran, Durango, CO (US);
Warren P Mitchell, Jr., Milliken, CO (US)

( * ) Notice: Subject to any disclaimer, the term of this patent is extended or adjusted under 35 U.S.C. 154(b) by 0 days.

(21) Appl. No.: 17/168,051

(22) Filed: Feb. 4, 2021

(51) Int. Cl.
*A01M 31/00* (2006.01)
*A45F 5/00* (2006.01)

(52) U.S. Cl.
CPC ............. *A45F 5/00* (2013.01); *A01M 31/004* (2013.01); *A45F 2200/0508* (2013.01); *A45F 2200/0566* (2013.01)

(58) Field of Classification Search
CPC . A01M 31/004; A45F 5/00; A45F 2200/0508; A45F 2200/0566; A45C 11/00
USPC ........................................................ 224/910
See application file for complete search history.

(56) References Cited

U.S. PATENT DOCUMENTS

| 5,244,430 | A  | * | 9/1993  | Legursky ............ | A01M 31/004 224/222 |
| 7,927,172 | B1 | * | 4/2011  | Kirby .................. | A01M 31/004 446/418 |
| 7,971,712 | B2 | * | 7/2011  | Talwar ................... | G10G 7/005 206/314 |
| 11,076,592 | B1 | * | 8/2021  | Summerfield ...... | A01M 31/004 |
| 2008/0274666 | A1 | * | 11/2008 | Weider ...................... | A45F 5/00 446/207 |
| 2011/0207380 | A1 | * | 8/2011  | Jacobsen ............ | A01M 31/004 446/202 |
| 2014/0065924 | A1 | * | 3/2014  | Dillon ................. | A01M 31/004 446/202 |
| 2016/0273703 | A1 | * | 9/2016  | Li ........................ | F16M 11/041 |

* cited by examiner

*Primary Examiner* — Adam J Waggenspack
(74) *Attorney, Agent, or Firm* — Bradley Fox

(57) ABSTRACT

An animal call carrier for carrying bugle type animal calls comprises a clasp at one end spaced apart from a cap at the opposite end along two elastic rods. The clasp is configured to grasp one end of an animal call around the outer diameter of the call near the mouthpiece of the call while the cap fits into the opening at the other end of the animal call. The clasp and cap are spaced apart at a distance along the elastic rods so that when the call is stowed, the elastic rods create a compression force between the clasp and the cap to hold the animal call securely in place.

14 Claims, 6 Drawing Sheets

ANIMAL CALL CARRIER

FIELD OF THE INVENTION

This invention relates to animal call carriers and methods for carrying animal calls and particularly an animal call carrier for a bugle type animal call that can be attached to a backpack to carry the call in a convenient location, accessed and grasped quickly as needed, and stowed blind with one hand without having to look at the carrier.

BACKGROUND ART

Animal calls have long been used by bird watchers, hunters, and others to meet their game-attracting objectives in the field. Many of these game calls are air-operated by mouth and great skill can be achieved in attracting a wide diversity of game. An air-operated or bugle horn animal call is typically held to the mouth by one hand and operated by blowing air through the mouth of the call. Users desire to have the call handy for use, but easily stowable for hiking hands free through the woods.

Animal calls are typically suspended from a lanyard or strap fitted around the user's neck or body to facilitate quick access when the calls are to be used. But this method of carry often leaves the call swinging or in the way of the user moving through the woods. Another method of carry is to store the animal call in a user's pack, but this method limits the use of the call and requires of the user's pack be removed prior to using the call.

These issues are commonly present when attempting to carry a bugle type animal call. Bugle type animal calls are often comprised of an elongated tube with a smaller opening at one end and a larger opening at the other end. The user typically blows into the smaller, mouthpiece opening, and the call emanates from the larger exit opening.

What is needed is an animal call carrier that securely stows and carries the bugle call in a manner that does not impede travel over and through rough terrain yet allows for easy retrieval and stowage of the call for use attracting animals.

SUMMARY OF THE INVENTION

The present invention is an animal call carrier for carrying bugle type animal calls. One embodiment of the present invention is an animal call carrier with a clasp at one end and a cap at the opposite end joined by two elastic rods. The animal call carrier is configured to grasp one end of an animal call while the cap fits into the opening at the other end of the animal call. The clasp and cap are spaced apart at a distance along the elastic rods so that when the call is stowed, the elastic rods create a compression force between the clasp and the cap to press and hold the animal call securely in place. Additionally, one or more positioning blocks are spaced along the elastic rods to properly orientate and position the carrier along a user's pack. Advantages to the invention include hands free, noiseless transportation of the animal call, ready access to the animal call, and one-handed, blind stowage of the call after use.

In one embodiment, the clasp is shaped to form a clip such that the animal call snaps in place at the narrow end of its tube. Generally, the clasp may be any device that grasps the outer diameter of an animal call. The cap is in the shape of a cone sized so that will snuggly fit the opening at the opposite end of the animal call. In one embodiment, the clasp attaches to the smaller outer diameter near the mouthpiece of the call and the cap is designed to fit the larger opening at the opposite end of the animal call. The clasp and cap are spaced apart along the elastic rods so that call is secured by a compressive force between the two components. The elastic rods connecting the clasp and the cap may be made from a carbon material to save weight or any other material that maintains the desired spacing between the clasp and the cap yet provides compressive force between the clasp and the cap when the call is stowed. There may be one or more elastic rods as desired.

The space between the clasp or the cap may be adjustable along the length of the rod to fit different sized calls. It will be appreciated by those skilled in the art that the present invention is not limited to any particular the arrangement described below.

BRIEF DESCRIPTION OF THE DRAWINGS

Embodiments of the present invention are illustrated by way of examples and are not limited to the accompanying drawings.

DETAILED DESCRIPTION OF INVENTION

Figure 1:
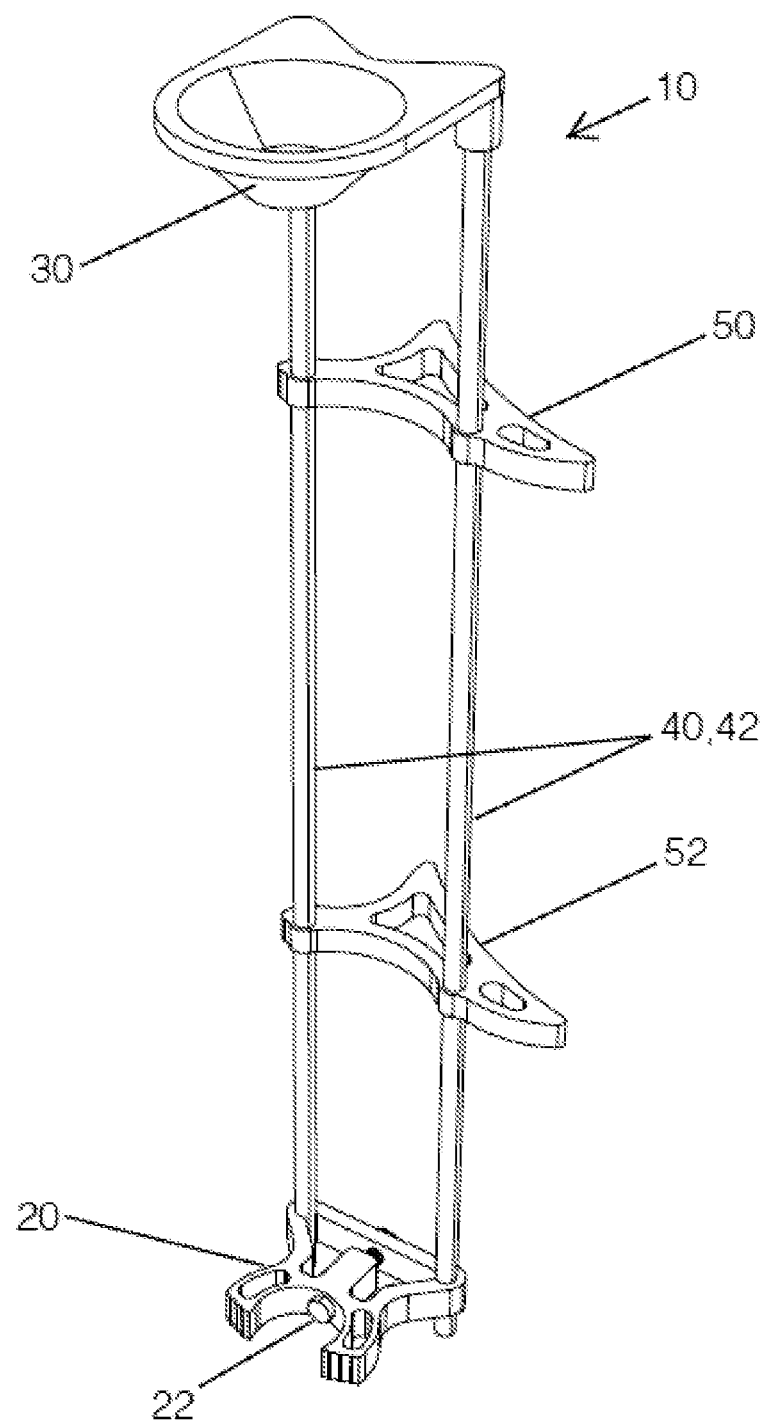
FIG. 1 shows a perspective view of an embodiment of the animal call carrier.

Referring now to the figures, FIG. 1 shows an embodiment of the animal call carrier 10 for carrying a bugle type animal call 5. The carrier 10 has a clasp 20, a cap 30, and two elastic connecting rods 40, 42. The clasp 20 and cap 30 are spaced apart at a distance along the elastic connecting rods 40, 42 such that when an outer diameter portion of the animal call 5 is retained in the clasp 20, and the larger opening of the animal call 5 is inserted under the cap 30, the elastic rods 40, 42 create a compression force between the clasp 20 and the cap 30 to secure the call 5 in place. Additionally, the carrier 10 may include positioning blocks 50, 52 that provide proper positioning and orientation when the carrier 10 is secured to a user's pack.

Figure 2:
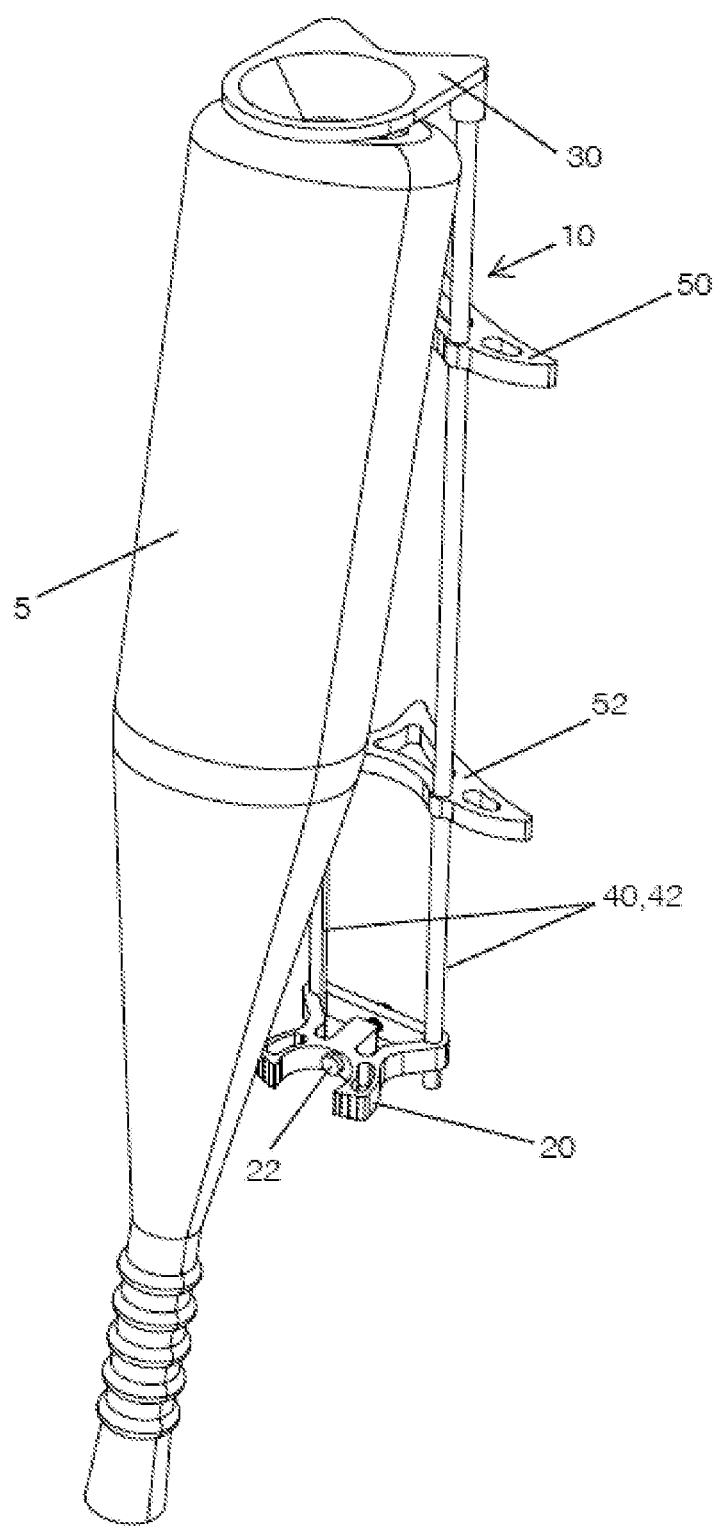
FIG. 2 shows a perspective view of an embodiment of the animal call carrier with the bugle call being inserted into the carrier.
Figure 3:
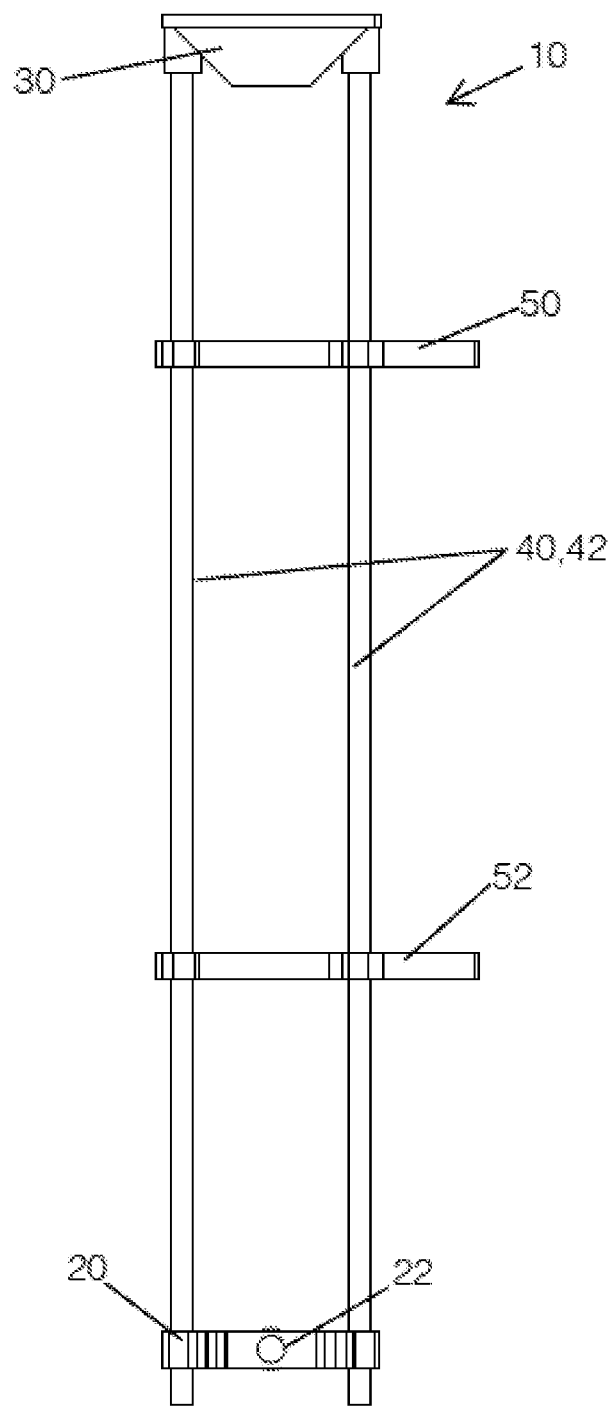
FIG. 3 shows a front view of an embodiment of the animal call carrier.
Figure 4:
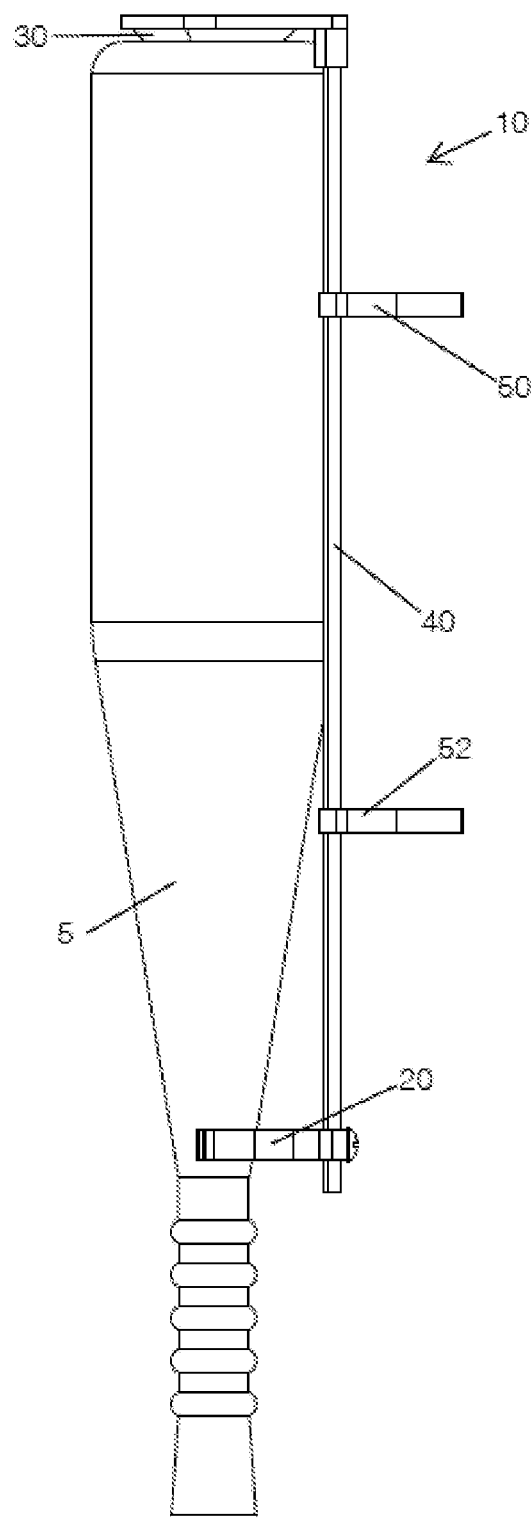
FIG. 4 shows a side view of an embodiment of the animal call carrier.
Figure 5:
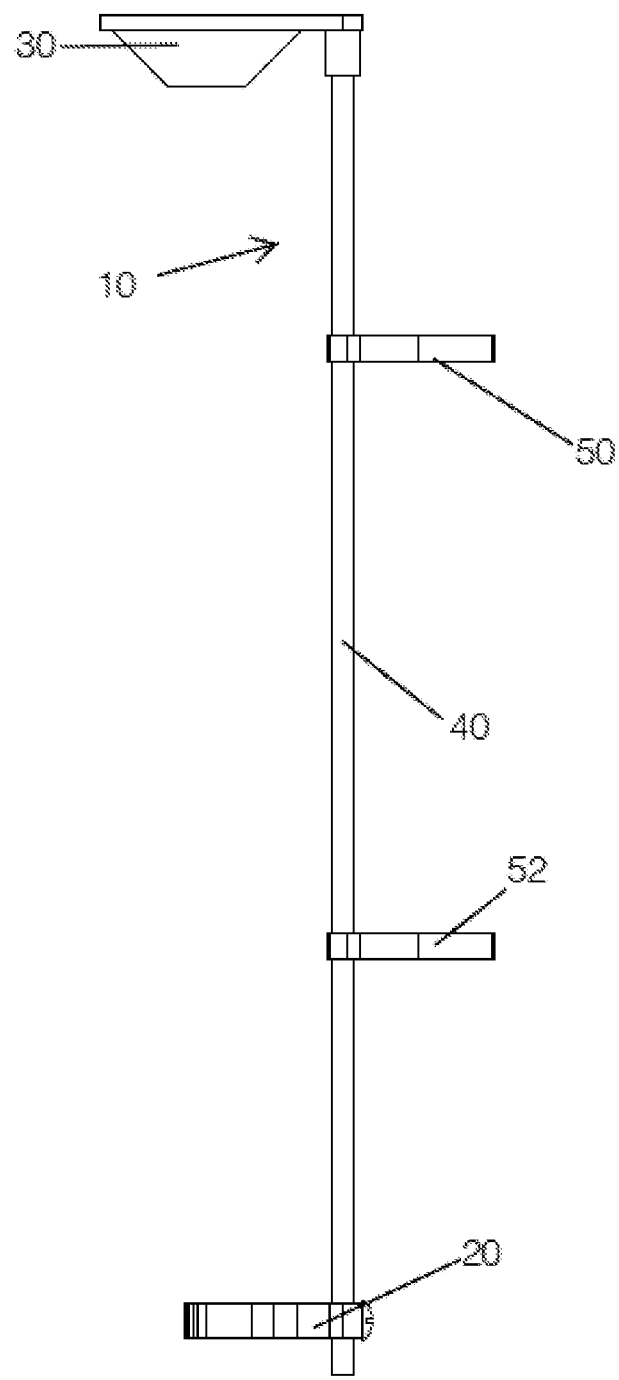
FIG. 5 shows a side view of an embodiment of the animal call carrier with the bugle call being inserted into the carrier.
Figure 6:
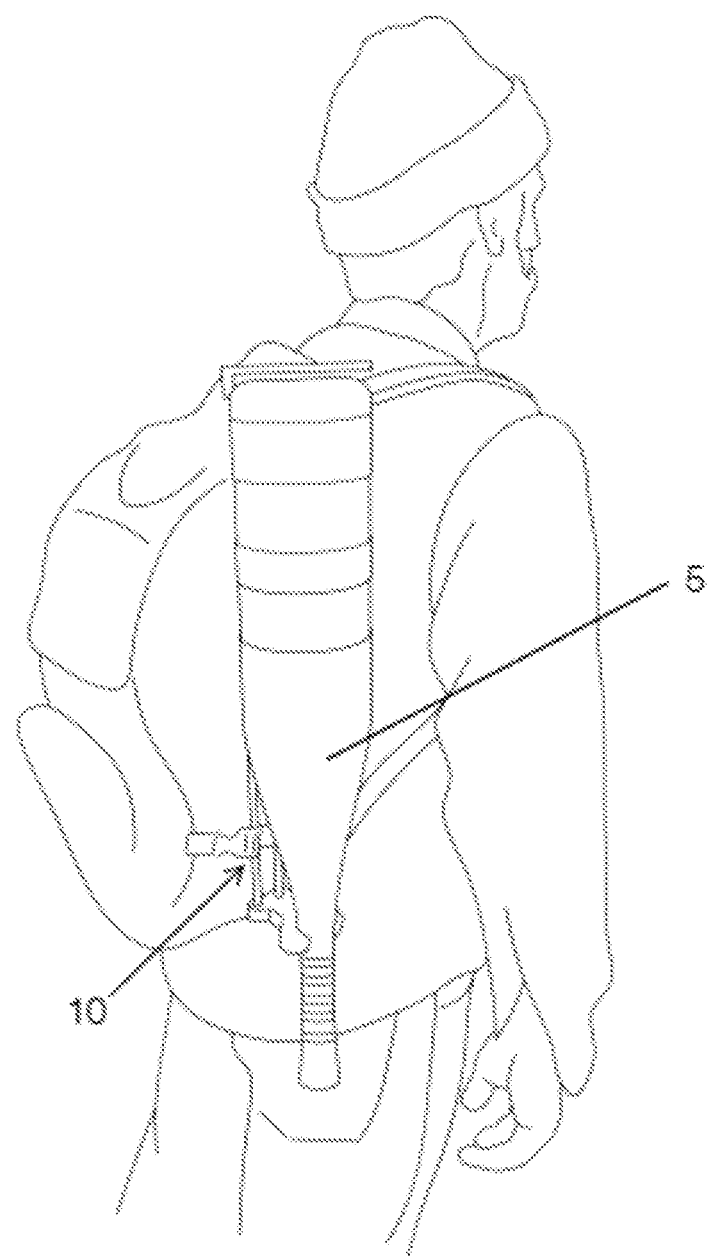
FIG. 6 shows a perspective view of the animal call carrier in use with the bugle call inserted into the carrier.

In one embodiment shown in FIG. 2, the clasp 20 is a clip that snaps around the outer diameter of the animal call 5. Typically, the clip will snap around a small diameter portion of the call 5 near the mouthpiece of the call 5. The clasp 20 may; however, grasp the outer diameter along different areas of the call 5. The clasp 20 may contain a dampener 22 to reduce vibration and noise when the call 5 is stowed in the carrier 10. The dampener 22 may be a piece of small rubber to additionally secure the call 5. The clasp 20 may also be comprised of a hook and latch type material that secures the call 5, an elastic compression fit or a combination of designs. One of skill in the art would understand that the clasp 20 may be comprised of any design that grasps the outer diameter of the call 5.

The cap 30 is configured to mate with the larger opening of the bugle call 5. The cap 30 may be any shape that inserts into the call opening and secures the call. The cap 30 may be made of a material that reduces noise or vibration of the call 5 while being carried. The cap 30 may be made of an elastic material to aid in retaining the call 5 in the carrier 10. In an alternative embodiment, the cap 30 maybe be sized to fit the mouth portion of the call 5. In this arrangement, the clasp 20 grasps the larger diameter of the call 5. The cap 30 may have openings to reduce the weight of the cap and subsequently the carrier 5. The cap 30 may be a cone of any shape that fits in the opening of the call 5 to secure the call. In an alternative embodiment, the cap 30 may consist of a hook shaped member that is attached to the rod and wraps around the edge of the call 5 entering the call opening to secure the call in place.

The clasp 20 and the cap 30 may be attached to the rods 40, 42 by any number of typical ways. In one embodiment, the rods 40, 42 pass through or into a portion of the clasp 20 and the cap 30. In other embodiments, the clasp and the cap may be attached using adhesive or another fastener. The location of the clasp and the cap may be adjustable along the length of the rods 40, 42.

The elastic rods 40, 42 may be formed from any material that can locate the clasp 20 and the cap 30 accurately along the length of the rods 40, 42 and also provide a compressive force between the clasp 20 and the cap 30 when the call is in place. In one embodiment the rods 40, 42 are formed from a carbon fiber material. This material reduces the overall weight of carrier while performing the duties of the rods. In an alternative embodiment, one rod 40 is used to join the clasp and the cap. One of skill in the art will recognize that one or more elastic rods can be used.

The positioning blocks 50, 51 are located along the rods 40, 42 to position and orient the carrier when attached to a user's pack. The positioning blocks 50, 51 are typically half-moon shaped to space the carrier off a user's pack and orient the carrier so that a user can operate it one handed. The rods 40, 42 may run through the positioning blocks 50, 51 to hold the blocks in place. The positioning blocks 50, 51 may also be attached to the rods in any typical manner. There may be a greater number of positioning blocks 50, 51 and the blocks may be of a different shape depending upon the shape of the call 5.

It will be appreciated by those skilled in the art that the present invention is not limited to any particular the arrangement described above.

What is claimed is:

1. An animal call carrier comprising:
a retaining clasp attached to an elastic rod and configured to attach one portion of an animal call to the animal call carrier;
a cap attached to the elastic rod and configured to mate with an opening of the animal call and spaced apart from the retaining clasp along the elastic rod such that when the animal call is retained in the retaining clasp and the cap is mated with the opening of the animal call, the elastic rod provides compressive force to retain the animal call between the retaining clasp and the cap.

2. The animal call carrier of claim 1 wherein clasp is a clip that grasps the outer diameter of the animal call.

3. The animal call carrier of claim 1 wherein the cap is conical shaped.

4. The animal call carrier of claim 1 wherein the elastic rod is made from a carbon fiber material.

5. The animal call carrier of claim 1 wherein the location of the retaining clasp is adjustable along the length of the elastic rod.

6. An animal call carrier comprising:
a retaining clasp attached to a first elastic rod and a second elastic rod and configured to attach one portion of an animal call to the animal call carrier;
a cap attached to the first elastic rod and the second elastic rod and configured to mate with an opening of the animal call and spaced apart from the retaining clasp along the first elastic rod and the second elastic rod such that when the animal call is retained in the retaining clasp and the cap is engaged with the opening of the animal call, the elastic rods provide a compressive force to retain the animal call between the retaining clasp and the cap.

7. The animal call carrier of claim 6 wherein the cap is conical shaped.

8. The animal call carrier of claim 7 wherein the clasp is a clip that grasps the outer diameter of the animal call.

9. The animal call carrier of claim 7 wherein the elastic rods are made from a carbon fiber material.

10. The animal call carrier of claim 6 wherein the location of the retaining clasp is adjustable along the length of the elastic rods.

11. A method for carrying an animal call comprising:
grasping a portion of the outer diameter of the animal call with a clasp, the clasp being spaced apart at a distance from a cap along a first and a second elastic rod; and
engaging an opening of the animal call under the cap, the cap being configured to mate with the opening of the animal call such that the elastic rod provides a compressive force to retain the animal call between the retaining clasp and the cap.

12. The method of claim 11 wherein the elastic rod is made from a carbon fiber material.

13. The method of claim 11 wherein the location of the retaining clasp is adjustable along the length of the elastic rod.

14. The method of claim 11 wherein the cap is conical shaped.

* * * * *